United States Patent
Kramer et al.

(10) Patent No.: US 6,229,226 B1
(45) Date of Patent: May 8, 2001

(54) VEHICULAR EXTERIOR REAR VIEW MIRROR ACTUATOR WITH EMISSION SUPPRESSION

(75) Inventors: Mark E. Kramer, Zeeland; Robert E. Schnell, Holland, both of MI (US)

(73) Assignee: Donnelly Corporation, Holland, MI (US)

(*) Notice: Subject to any disclaimer, the term of this patent is extended or adjusted under 35 U.S.C. 154(b) by 0 days.

(21) Appl. No.: 09/277,632

(22) Filed: Mar. 26, 1999

(51) Int. Cl.[7] ............................................. H02K 5/24
(52) U.S. Cl. ........................ 307/10.1; 310/51; 333/12; 361/118
(58) Field of Search .......................... 307/10.1, 727; 333/12; 323/908; 318/443; 361/118; 310/51; 257/665; 327/551; 180/167

(56) References Cited

U.S. PATENT DOCUMENTS

| 4,105,007 | * | 8/1978 | Mochimaru | 333/12 |
| 4,814,687 | * | 3/1989 | Walker | 323/908 |
| 5,404,085 | * | 4/1995 | Resch et al. | 318/443 |
| 5,909,350 | * | 6/1999 | Anthony | 361/118 |
| 5,942,819 | * | 8/1999 | Burgess et al. | 310/51 |
| 5,963,442 | * | 10/1999 | Yoshida et al. | 363/98 |

* cited by examiner

*Primary Examiner*—Albert W. Paladini
(74) *Attorney, Agent, or Firm*—Van Dyke, Gardner, Linn & Burkhart, LLP

(57) ABSTRACT

A vehicular mirror actuator for adjustably positioning a mirror includes at least one motor with a casing and one or more power leads for powering the motor. An electromagnetic interference suppressor is included in the mirror actuator assembly and is mounted externally to the motor casing. The interference suppressor may include either a choke or at least one ferrite bead coupled between the power lead and the motor. The interference suppressor may be positioned either internally within the actuator housing, or externally to the actuator housing. Alternatively, the interference suppressor may include a metallic lining that surrounds the vehicular mirror actuator and which includes at least one feed-through capacitor coupled to said metallic lining and a source of power.

74 Claims, 9 Drawing Sheets

VEHICULAR EXTERIOR REAR VIEW MIRROR ACTUATOR WITH EMISSION SUPPRESSION

BACKGROUND OF THE INVENTION

This invention relates generally to vehicular mirrors, and more particularly, to vehicle mirrors which are electrically adjustable by way of one or more motors in a mirror actuator.

Many of today's automobiles and other types of vehicles include side view, exterior mirrors which can be automatically adjusted by the driver through controls located in the interior of the vehicle. This allows the driver of the vehicle to adjust the mirrors to the desired viewing angle without having to roll down a window and manually adjust the mirrors by hand. The automatic adjustment of the mirrors is typically accomplished through the use of one or more motors positioned inside of the housing of an actuator that positionably supports the mirror. There are customarily two motors inside of the actuator housing which are used to orient the angle of the mirror. Each motor changes the orientation of the mirror in a different orthogonal direction. In some situations a third motor is placed inside the mirror housing which allows the mirror housing to automatically fold with respect to the vehicle when the mirror is not in use. The folding of the mirror reduces the outward extent of the mirror when the vehicle is not in use, or when it is being maneuvered in narrow spaces where the exterior mirrors might otherwise be impacted by surrounding objects.

The motors which adjust the orientation of the mirror and fold the mirror assembly both emit electromagnetic interference when activated. This electromagnetic interference can undesirably interfere with the vehicle's electrical systems. One common form of interference is with the vehicle's radio, if the occupant happens to be listening to the radio while simultaneously adjusting the mirrors. Automobile manufacturers are increasingly demanding that this electromagnetic interference be reduced, especially in the frequency ranges which interfere with the radio signals detected by the vehicle's radio. Accordingly, there is a desire to eliminate such electromagnetic interference. In the past, several techniques have been used for reducing the electromagnetic interference created by vehicle mirror motors. Such techniques have included the use of a rubber ring resistor or a disc varistor positioned within the casing of the motor. While such techniques provide a certain level of noise suppression, it is desirable to provide a system with an improved level of noise suppression.

SUMMARY OF THE INVENTION

The present invention provides a vehicular mirror actuator for adjustably positioning a mirror which has an increased level of suppression of its electromagnetic interference. The vehicular exterior mirror actuator includes at least one motor that is adapted to adjustably position the mirror. The motor has first and second inputs for receiving power. A power lead is also provided and adapted to provide power to the motor. An electromagnetic interference suppressor for suppressing the electromagnetic interference is operatively coupled to the power lead and the motor. According to this aspect of the invention the interference suppressor is mounted at least partially externally to the motor casing.

According to another aspect of the invention, the electromagnetic interference suppressor may include a choke operatively coupled between the power leads and the motor. Alternatively, the interference suppressor may include one or more ferrite beads or inductors operatively coupled between the power leads and the motor. The interference suppressor may be mounted on a circuit board or otherwise implemented. The circuit board can either be positioned inside of a housing that houses the mirror actuator, or externally to the mirror actuator housing. When positioned externally to the mirror actuator housing, the circuit board includes electrical connections which extend through the mirror actuator housing and electrically couple to the motors. When the circuit board is positioned internally in the mirror actuator housing, it may be coupled directly to stamped electrical leads that are electrically coupled to one or more motors in the actuator.

According to still further aspects of the present invention, the electromagnetic interference suppressor may include a first and second capacitor coupled between inputs into the vehicle mirror motor and a metallic casing which at least partially surrounds the motor. Additionally, the suppressor may include a capacitor coupled between the first and second inputs to the motor. In still other aspects, the suppressor may include suppression circuitry for a second or third motor. The suppression circuitry for the second or third motor is the same as for the first motor. The one or more motors suppressed by the suppression circuitry may include the motors for adjusting the orientation of the mirror inside of the side view mirror assembly, the motor for folding the entire mirror assembly with respect to the vehicle, or both. The capacitors may be mounted on the circuit board, which may either be internal or external to the mirror actuator housing. In still other aspects, the interference suppressor may include a conductive lining as part of the housing surrounding the actuator. The conductive lining is electrically coupled to one terminal of feed-through capacitors mounted on the housing.

The vehicular mirror actuator of the present invention provides a simple manner of reducing the electromagnetic emissions emitted by motors in electrically adjustable vehicle mirrors. The noise suppression provided by the present invention provides an increased amount of suppression over the known prior art. The vehicular exterior mirror actuator also provides a compact layout for positioning the noise suppression circuitry either inside or outside of the mirror actuator housing. These and other objects, advantages, and benefits of the present invention will become apparent upon review of the following specification in conjunction with the drawings.

DETAILED DESCRIPTION OF THE PREFERRED EMBODIMENTS

Figure 1:
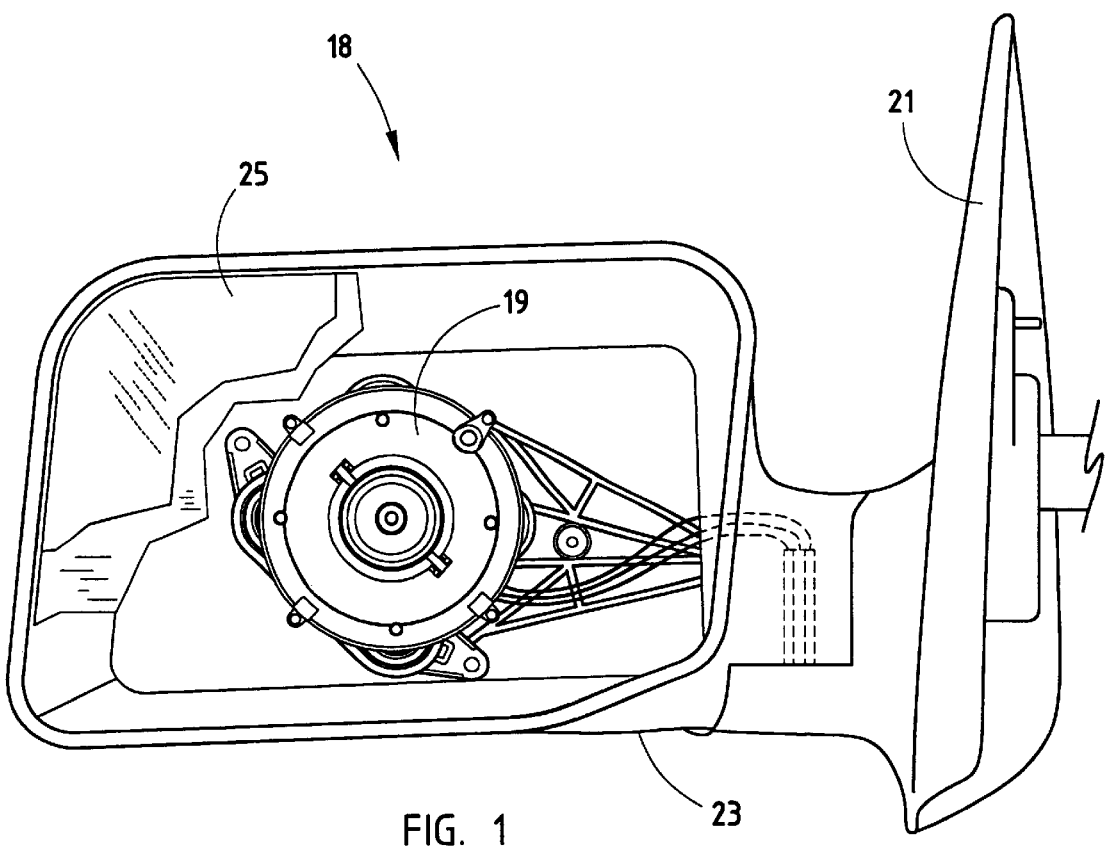
FIG. 1 is a rear, elevational view, looking forward with respect to a vehicle of an exterior mirror assembly according to the invention, with a portion of the reflective element removed to reveal internal features thereof.
Figure 2:
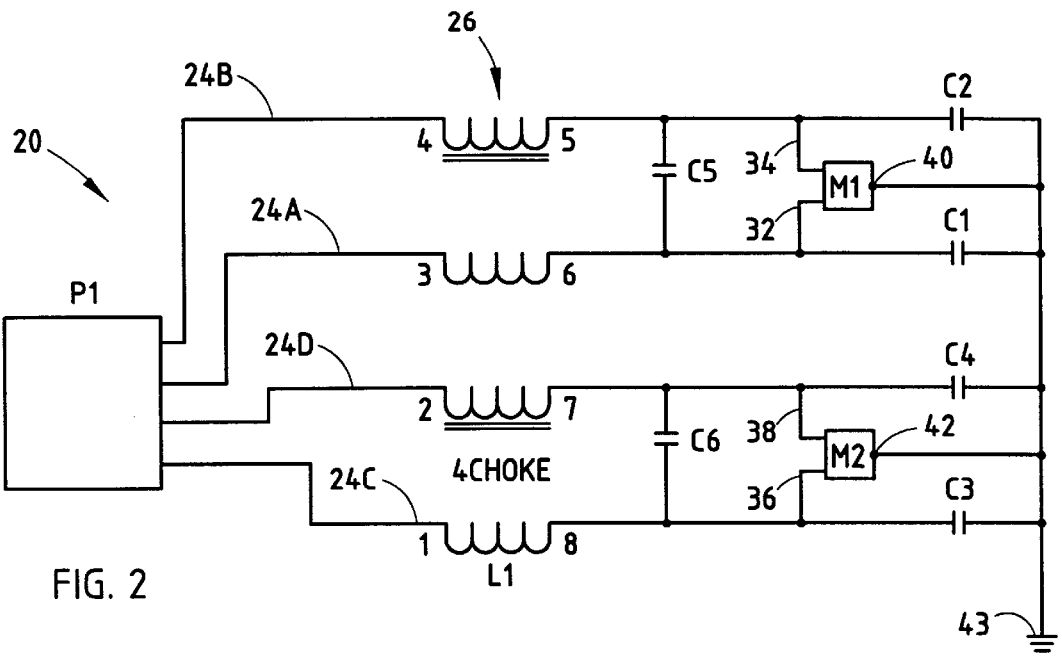
FIG. 2 is a circuit diagram of a control system with a first embodiment of a noise suppressor according to the present invention.

The preferred embodiment will now be described with reference to the accompanying drawings wherein like reference numerals correspond to like elements in the several drawings. A vehicular exterior rear view mirror assembly 18 with a mirror actuator 19 is depicted in FIG. 1. Mirror assembly 18 is mounted to a vehicle 21 by way of a support 23 which may be foldably attached to vehicle 21 to allow mirror assembly 18 to be folded with respect to vehicle 21. Mirror actuator 19 is positioned behind a mirror 25 and coupled thereto so that automatic adjustments made be made to the position of the mirror. The complete structure of mirror actuator 19 and vehicle mirror assembly 18 may be found in commonly assigned, U.S. patent application Ser. No. 09/228,348, filed Jan. 11, 1999, entitled MIRROR ACTUATOR ELECTRICAL CONNECTOR, the disclosure of which is hereby incorporated herein by reference. Actuator assembly 19 includes a control system 20 having electromagnetic noise and interference suppression which suppresses the electromagnetic interference emissions created by the motors used to adjust the position of mirror 25 (FIG. 2). In the depicted embodiment in FIG. 2, control system 20 includes two motors M1 and M2 positioned inside the vehicle mirror assembly. Typically, the adjustment of the vehicle mirror relies on two motors, each of which adjusts the orientation of the mirror along one of two orthogonal axes. Some vehicle mirrors also include a third motor (not shown) to provide the ability to have the mirror assembly folded with respect to the vehicle. The same noise suppression circuitry coupled to motors M1 and M2 can be added to this third motor to suppress its interference. Whether the noise suppression is designed for two or three motors, the electrical motors used to move the mirror have their electromagnetic emissions suppressed.

Control system 20 is powered by a power source P1 which is located outside of the mirror assembly, typically somewhere on the vehicle. In the situation where the vehicle mirror assembly only includes two motors, there are four power leads 24a, b, c, and d. Power leads 24a and b supply power to one of the motors, while power leads 24c and d supply power to the other of the motors. Each of the power leads 24 is coupled to a noise suppressor, such as a choke 26. In the current embodiment, choke 26 is a four-line, common mode toroidal choke. Such a choke is marketed by Taiyo Yuden of Japan, under Part No. CM04RC05T. Other types of noise suppressors can be used within the scope of the invention. For example, two dual line chokes can alternately be used. It is also not necessary that the choke have a toroidal shape. After passing through noise suppressor 26, power leads 24a–d are fed into a first motor M1 and a second motor M2. Specifically, leads 24a and b are fed into first and second inputs or terminals 32 and 34, respectively, of first motor M1. Power leads 24c and d are fed into first and second inputs or terminals 36 and 38, respectively, of second motor M2. Control system 20 further includes a second noise suppressor such as a capacitor C5 coupled across terminals 32 and 34 of first motor M1. A capacitor C6 is coupled across terminals 36 and 38 of second motor M2 and helps reduce the interference provided by motor M2. Capacitors C5 and C6 are located in the illustrated embodiment between the motors and choke 26.

Control system 20 may further include a third noise suppressor such as capacitor C1 coupled between first input 32 of first motor M1 and a motor casing 40 which at least partially surrounds motor M1. Casing 40 is typically a metallic housing. The third noise suppressor may include a capacitor C2 coupled between second input 34 of first motor M1 and floating ground 43 defined by casing 40. The third noise suppressor may also include a capacitor C3 coupled between first input 36 of second motor M2 and a casing 42 of second motor M2. Casing 42 of second motor M2 is also typically a metallic casing. Casing 42 may further be electrically coupled to casing 40 of first motor M1 defining a floating ground 43 (FIG. 2). The third noise suppressor further includes a capacitor C4 coupled between second input 38 of second motor M2 and floating ground 43. Capacitors C1–C6, in combination with choke 26, provide improved suppression of electromagnetic interference generated by first and second motors M1 and M2. Capacitors C1–C6 help prevent electromagnetic interference emissions by counteracting the noise created from the sparks and arcing across the motor commutators and brushes. In the current embodiment, capacitors C1–C4 have nominal capacitance values of 0.001 microfarads. Capacitors C5 and C6 have nominal capacitance values of 0.1 microfarads in the current embodiment. Other capacitance values can, of course, be used as would be understood by one skilled in the art. First and second motors M1 and M2 are DC electric motors, although other types of motors can be used.

Figure 3:
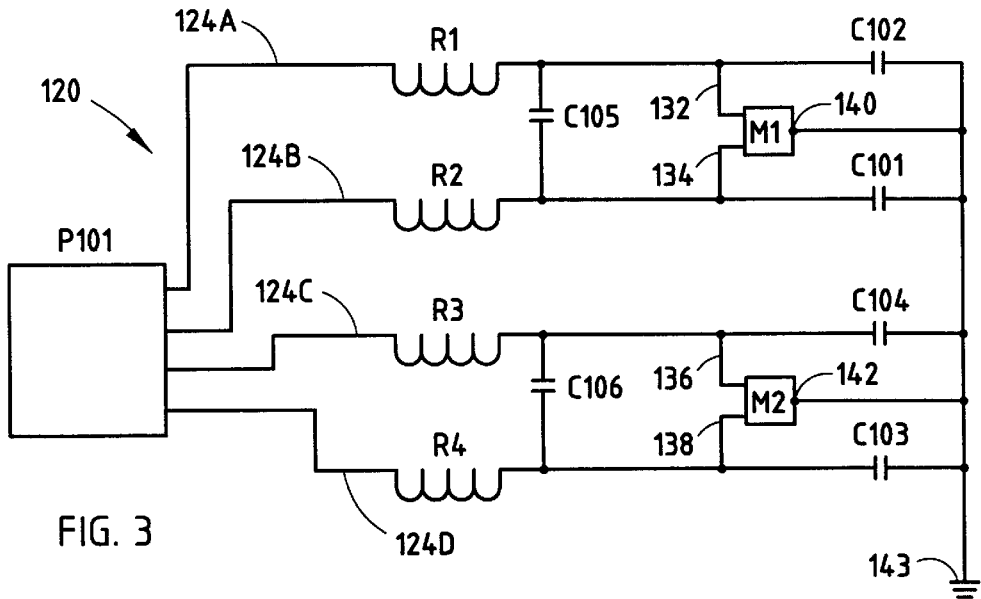
FIG. 3 is a circuit diagram of a control system with a second embodiment of a noise suppressor according to the present invention.

A second embodiment of a control system 120 having electromagnetic interference suppression is depicted in FIG. 3. Control system 120 is coupled to a power source P101 which s likewise typically located outside of the mirror assembly and somewhere on the vehicle. Four power leads 124a–d are connected to power source P101 and fit into the vehicle mirror assembly. Power lead 124a is coupled to a ferrite bead R1. After passing through ferrite bead R1, power lead 124a is fed into a first input 132 of first motor M1. Power lead 124b passes through a second ferrite bead R2 before it is fed into a second input 134 of first motor M1. Power lead 124c passes through a third ferrite bead R3 before being fed into a first input 136 of a second motor M2. Power lead 124d passes through a fourth ferrite bead R4 before being fed into a second input 138 of second motor M2. In the current embodiment, ferrite beads R1–R4 are marketed by MuRata of Japan, under the Part. No. BL02RN2-R62-01. Of course, other types of ferrite beads can be used within the scope of the invention. In the current embodiment, the ferrite beads have nominal impedance values of 130 ohms at 100 MHz. Ferrite beads R1–R4 could alternatively be replaced with inductors having similar impedance values as the ferrite beads in the frequency ranges being suppressed.

Control system 120 also includes a pair of capacitors C105 and C106 which are each coupled across the inputs to first and second motors M1 and M2, respectively. Each of the inputs to first and second motors M1 and M2 are also coupled to the motor casings 140 and 142 by way of four capacitors C101–104. Motor casings 140 and 142 are electrically coupled to each other and form a floating ground 143. Capacitors C101–104, in the current embodiment, have a nominal capacitance value of 0.001 microfarads. Capacitors C105 and C106 have nominal capacitance values of 0.1 microfarads in the current embodiment. Variations can be made to these values, as would be understood by one skilled in the art.

Figure 4:
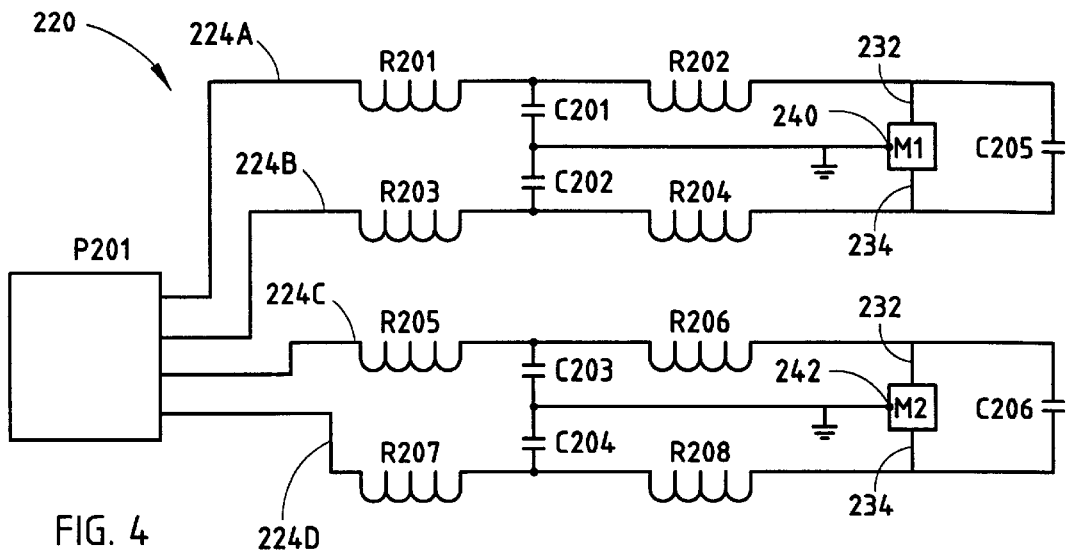
FIG. 4 is a circuit diagram of a control system with a third embodiment of a noise suppressor according to the present invention.

A third embodiment of a control system 220 for a mirror actuator having electromagnetic interference suppression is depicted in FIG. 4. Suppressor 220 is coupled to a power source P201 which is typically located somewhere outside of the vehicle mirror assembly. Four power leads 224a–d provide power from power source P201 to the motors M1 and M2. Each power lead 224 passes through a noise suppressor comprising two ferrite beads (R201–R208), arranged in electrical series connection, before coupling with the input terminals to motors M1 and M2. A pair of capacitors C201 and C202 are coupled between a casing 240 of motor M1 and power leads 224a and b, and provide further suppression. Another pair of capacitors C203 and C204 are coupled between the casing 242 of motor M2 and power leads 224c and 224d and provide still further suppression. The casings of motors M1 and M2 are both preferably metallic, or otherwise conductive, and form a floating ground 243. A fifth and sixth capacitor C205 and C206 are coupled between the respective motor inputs (232–238) into motors M1 and M2. Each of the ferrite beads have a nominal impedance value of 100 ohms at 100 MHz in the current embodiment. Capacitors C201–C204 have nominal capacitance values of 470 picofarads, and capacitors C205 and C206 have nominal capacitance values of 0.1 microfarads, in the current embodiment. Other impedance and capacitance values can be used within the scope of the invention, as would be understood by one skilled in the art. Ferrite beads R201–R208 could alternatively be replaced with inductors having similar impedance values as the ferrite beads in the frequency ranges being suppressed.

Figure 5:
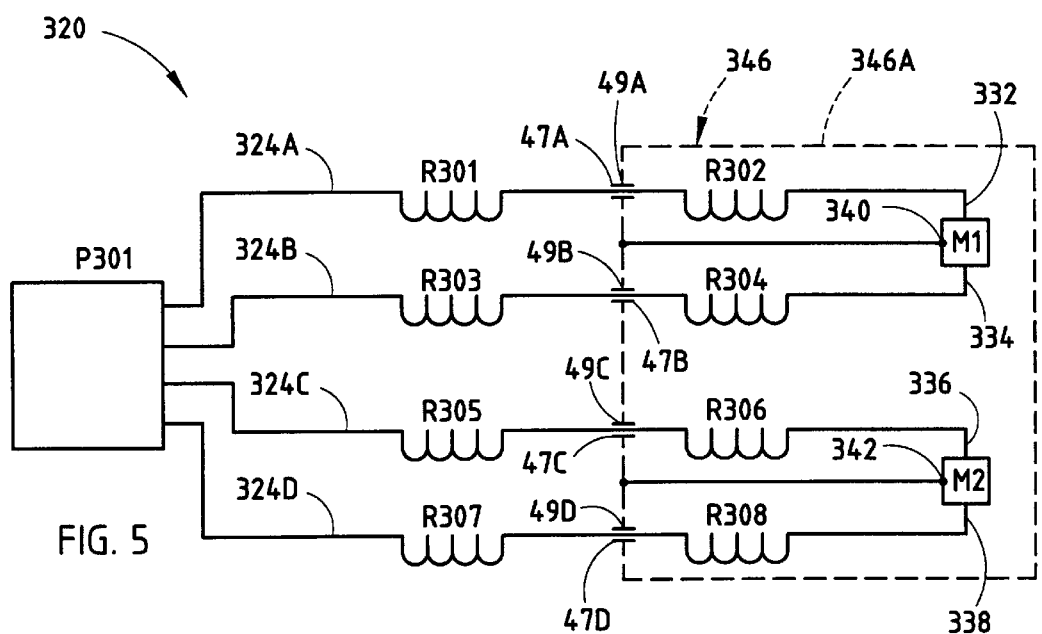
FIG. 5 is a circuit diagram of a control system with a fourth embodiment of a noise suppressor according to the present invention.

A fourth embodiment of a control system 320 having electromagnetic noise suppression is depicted in FIG. 5. Control system 320 receives power from a power source P301 which is typically located outside of the mirror assembly on the vehicle. Four power leads 324a–d deliver power from power source P301 to the inputs 332–338 of first and second motors M1 and M2. Power lead 324a passes through two ferrite beads R301 and R302, arranged in series, prior to contacting input 332 into motor M1. Power leads 324b–d likewise each pass through two series-arranged ferrite beads (R303–R308) prior to contacting the other inputs to motors M1 and M2. Ferrite beads R302, R304, R306, and R308 are all positioned inside of a housing 346 while ferrite beads R301, R303, R305 and R307 are positioned outside of housing 346. Ferrite beads R301–R308 can be replaced with inductors, if desired, having similar impedance values in the frequencies being suppressed.

Control system 320 is positioned within a housing 346 that includes a conductive surface, generally shown at 346a. The conductive surface can be implemented as a metallic film, although other conductive materials may be used. If the surface is metallic, it may be formed in a variety of different manners. The conductive coating can be created by sputtered zinc sprayed onto either the interior or exterior of housing 346. Alternatively, the coating could be created by any EMI coating sprayed onto housing 346, including, but not limited to, TARA EMI spray, which is marketed by Egyptian Coatings of Lafayette, Ind. As another alternative, the coating could be created by manufacturing housing 346 completely of metal, or by including a metallic shell that either surrounds or fits inside of housing 346. Alternatively, the housing could be manufactured from a conductive polymer. However created, the conductive surface should define a substantially complete enclosure that encloses the motors whose emissions are being suppressed.

The conductive surface includes apertures schematically illustrated at 49a–d in FIG. 5. The apertures 49a–d allow each power lead 324a–d to pass to the interior of the conductive lining and deliver power to the motors. Feed-through capacitors 47a–d are placed in the apertures and are electrically coupled to the conductive lining. In the current embodiment, feed-through capacitors 47a–d have a nominal capacitance value of 0.1 microfarad, although other values can be used.

It will be understood that various modifications can be made within the scope of the invention to the interference suppressors diagrammed in FIGS. 2–5. As one example, a third motor can be added to each of these circuits along with the corresponding electrical components for the third motor. In system 20, the third motor would receive power from an additional two power lines (not shown) which could either be coupled to choke 26, or could be coupled to a separate, dual-line choke. In system 320, this third motor would normally be located outside of housing 346 and therefore would require a separate conductive shell or lining surrounding this third motor. This separate shell may include its own pair of feed-through capacitors for the power leads. The third motor in any of these additional embodiments would typically be used as a power-fold for folding the entire mirror assembly with respect to the vehicle. It will be understood, however, that the third motor could be used for other purposes, and that the suppressors disclosed herein could be further modified to accommodate four or more motors, if desired.

As yet another modification, it will be understood that control system 20, 120, 220, or 320 could include a varistor that is coupled across the terminals of each of the motors M1 and M2. Such a varistor would be in addition to the circuitry disclosed and would be mounted externally to the motor casings. One acceptable varistor is marketed by S & M Components of Germany under Part No. SHCV-SR1K20M474X. Other varistors can, of course, be used.

Figure 6:
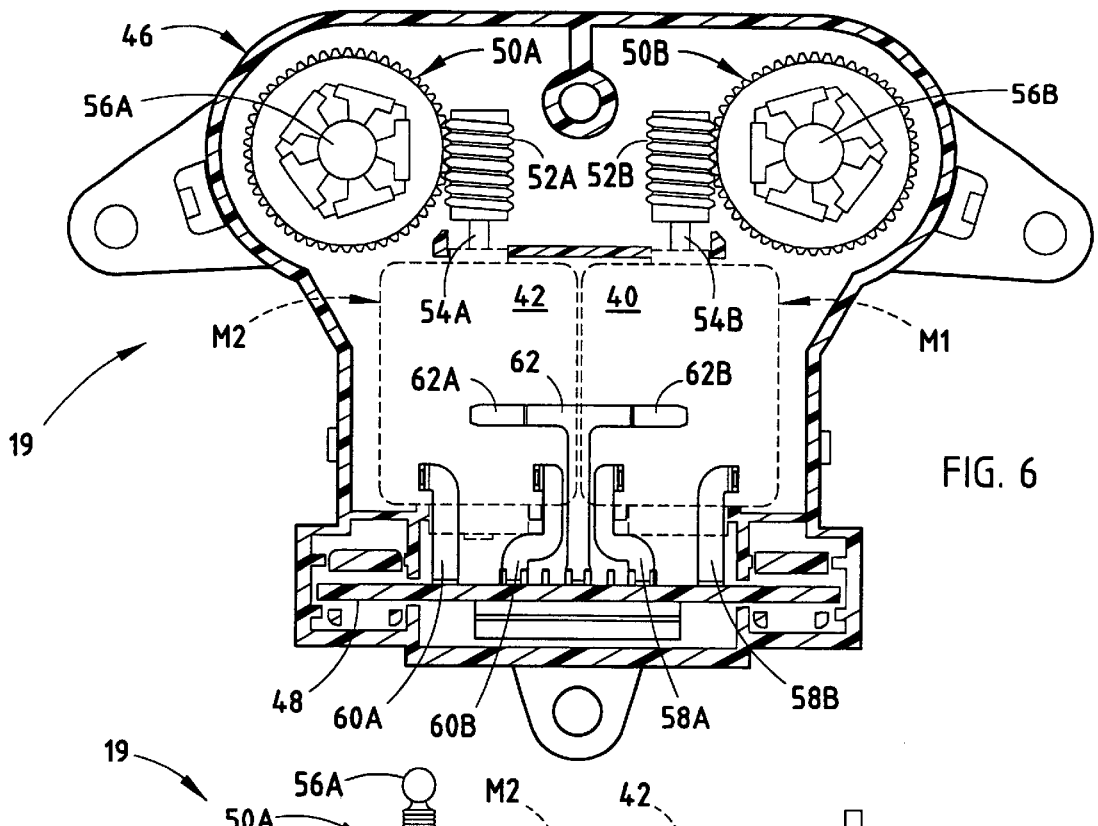
FIG. 6 is a plan view of a portion of a mirror actuator assembly used in conjunction with several embodiments of the noise suppressor of the present invention.
Figure 7:
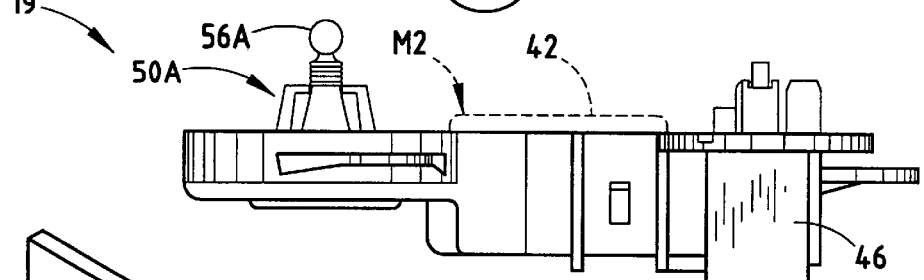
FIG. 7 is a side, elevational view of the mirror actuator assembly of FIG. 6.
Figure 8:
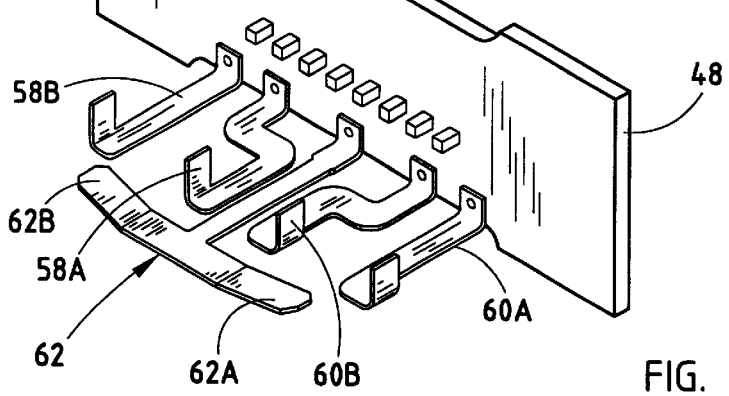
FIG. 8 is a perspective view of a circuit board with stamped, electrical connections mounted thereto.

FIGS. 6–7 depict a portion of one type of mirror actuator 19 in which any of the previously described control systems 20, 120, 220, or 320 with interference suppression can be physically implemented. For ease of discussion, mirror actuator 19 will be described with reference to the components of control system 20, although it will be understood that the control systems 120, 220 and 320 can similarly be implemented in the manner shown in FIGS. 6–8. Mirror actuator 19 includes a housing 46 (only a lower portion shown), a printed circuit board 48, first and second motors M1 and M2, and gear assemblies 50. First and second motors M1 and M2 each include worm gears 52a and b mounted around shafts 54a and b of first and second motors M1 and M2. A complete description of actuator 19 and its operation is not included herein, but can be found in co-pending application Ser. No. 09/228,348. Suffice it to say, the rotation of shafts 54a and b on first and second motors M1 and M2 causes rotation of worm gears 52a and b, which in turn cause gear assemblies 50a and b to rotate. The rotation of gear assemblies 50a and b causes a pair of threaded, telescoping positioning members 56a and b to either move into or out of the plane defined by the page of FIG. 6. The movement of telescoping positioning members 56a and b causes the orientation of mirror 25 to change accordingly. It will be understood that housing 46 and the layout of components inside of housing 46 can be altered from that depicted in FIG. 6. As but one example, housing 46 could take the shape of the housing disclosed in commonly assigned application Ser. No. 08/780,996, filed Jan. 1, 1997, and entitled Housing With Integral Electrical Connectors For Rearview Mirror Actuator Assembly, now U.S. Pat. No. 5,900,999, the disclosure of which is hereby incorporated herein by reference.

Printed circuit board 48 includes the electrical suppression components of either control system 20, 120, or 220. Printed circuit board 48 could alternatively include the electrical suppression components of system 320 that are positioned inside of the conductive surface 346a of housing 346. Printed circuit board 48 includes a plurality of stamped, electrical leads 58–62 (see FIGS. 6 and 8). Stamped electrical leads 58a and b correspond to the first and second inputs (e.g. 32, 34, 132, 134, 232, and 234) in the various control systems. Stamped leads 60a and b correspond to the first and second inputs (e.g. 36, 38, 136, 138, 236, and 238) into second motor M2. Stamped electrical lead 62 corresponds generally to the floating ground. Stamped lead 62 includes two branches 62a and 62b which contact motor casings 40 and 42, respectively. Each of the electrical, stamped leads 58–62 are electrically coupled to printed circuit board 48 in a known manner. Alternatively, leads 58–62 can be molded into housing 46 and is disclosed in commonly assigned U.S. application Ser. No. 08/780,996. Circuit board 48 may also include the electrical components necessary to allow memory storage and control of different orientations of the mirror, such as is disclosed in, for example, commonly assigned U.S. application Ser. No. 09/135,375, filed Aug. 17, 1998, and entitled Memory Mirror System For Vehicles, now U.S. Pat. No. 6,093,976, the disclosure of which is hereby incorporated by reference.

Figure 9:
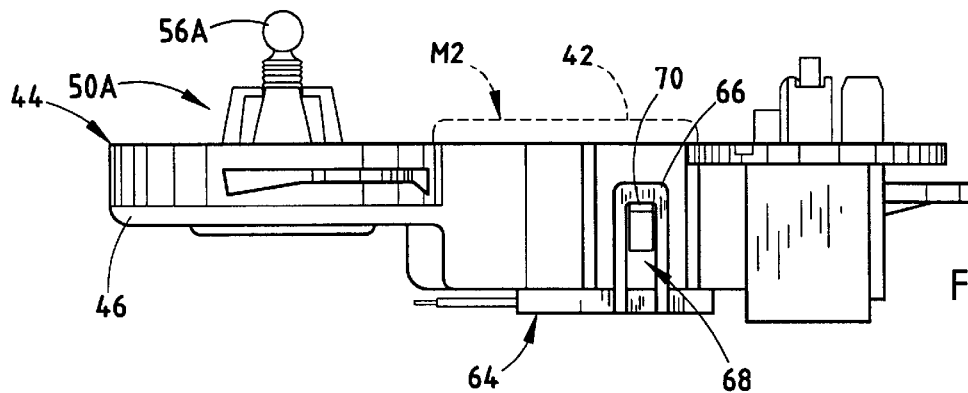
FIG. 9 is a side elevational view of a second embodiment of a mirror actuator assembly.
Figure 11:
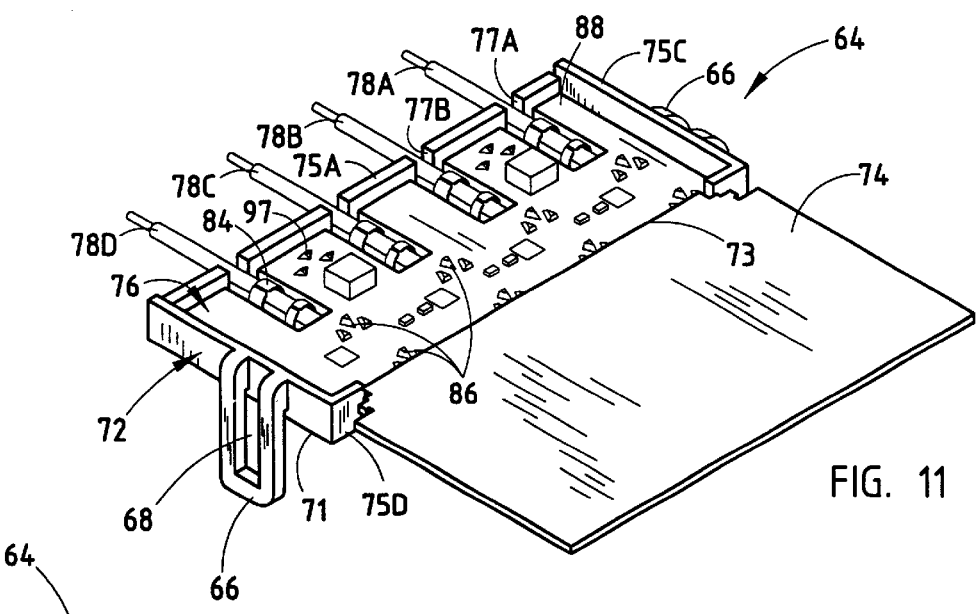
FIG. 11 is a perspective view of the electrical connector assembly of FIG. 10.

FIGS. 9–17 depict an alternative manner of physically implementing the suppression components of control systems 20, 120, and 220. In the embodiment of FIGS. 9–17, the suppression circuitry of systems 20, 120, or 220 is mounted externally to housing 46, inside an electrical connector 64. Electrical connector 64 is manufactured separate from housing 46 and is snap fittingly mounted to the exterior of housing 46 during assembly of the mirror. As shown in FIG. 9, electrical connector 64 includes a pair of retention members 66 which define a retention loop 68. Electrical connector 64 is preferably manufactured from a resilient plastic material which allows retention members 66 to bend sufficiently to allow them to snap fit over a pair of retaining extensions 70 located on the exterior of housing 46. When electrical connector 64 is attached to housing 46, retaining extensions 70 extend into retention loop 68 and prevent removal of electrical connector 64 from housing 46.

Figure 10:
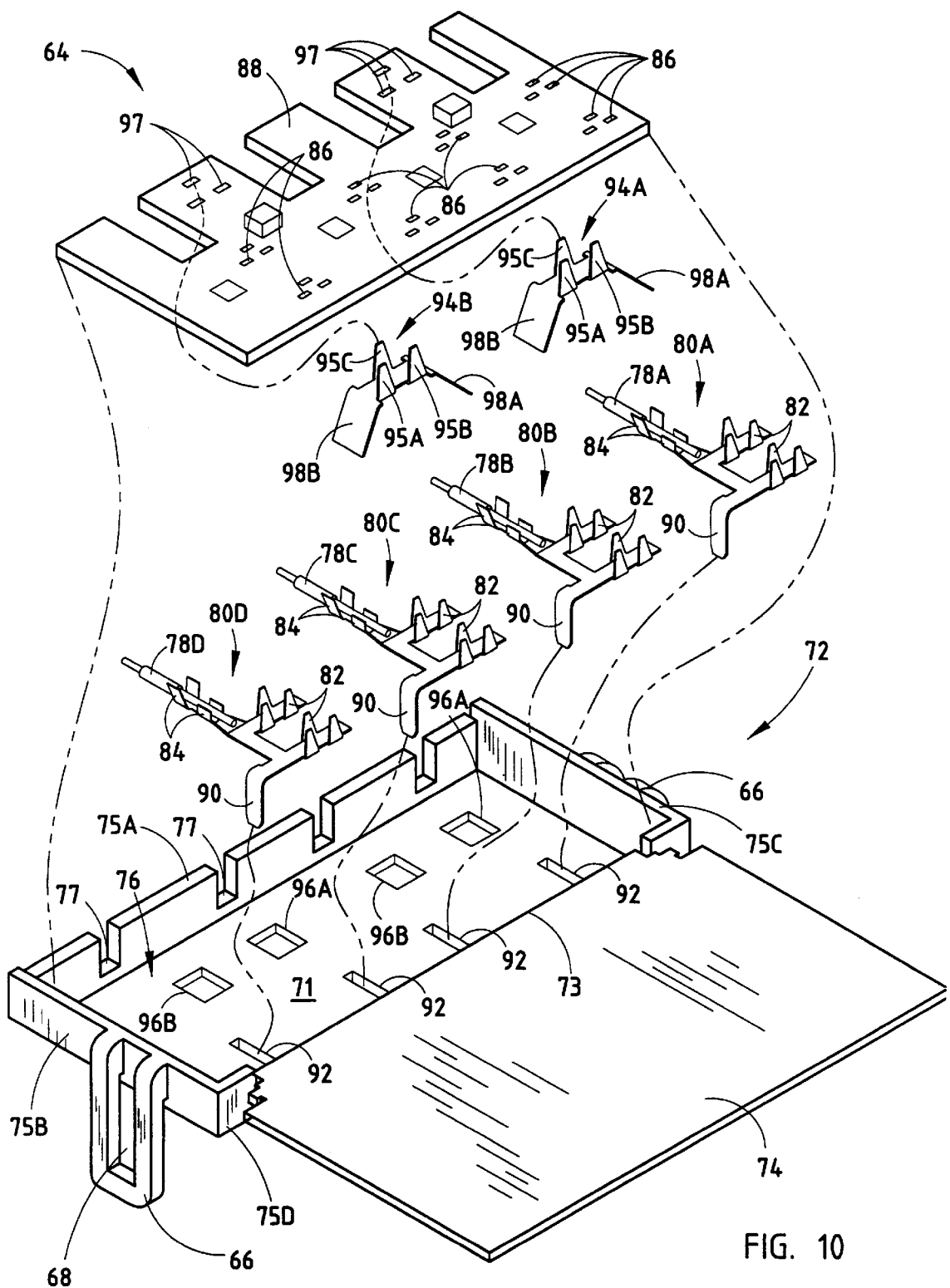
FIG. 10 is an exploded, perspective view of an electrical connector assembly according to one aspect of the present invention.
Figure 16:
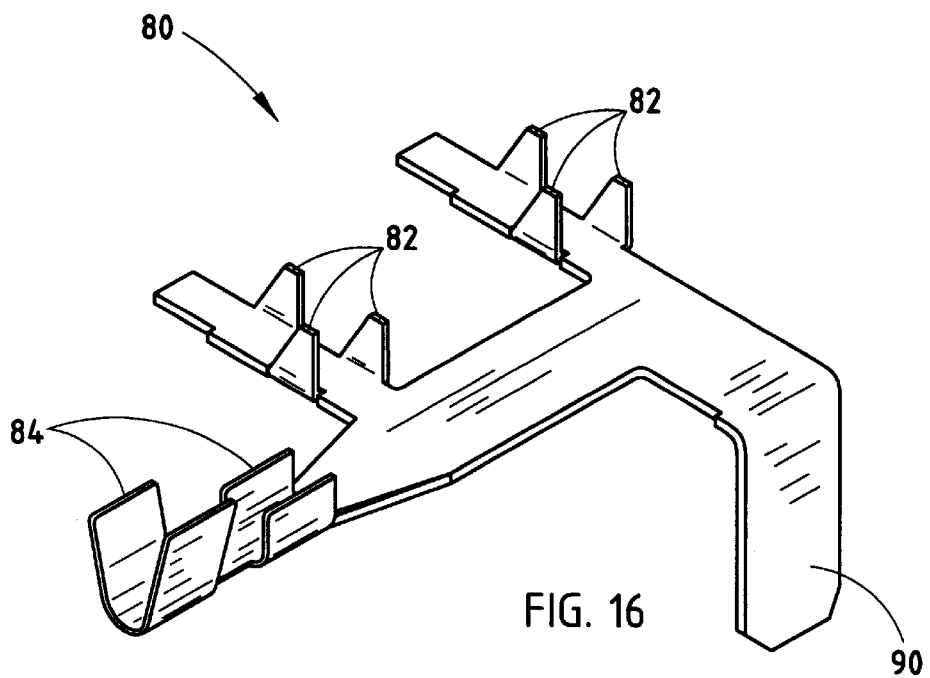
FIG. 16 is a perspective view of a wire connector.
Figure 17:
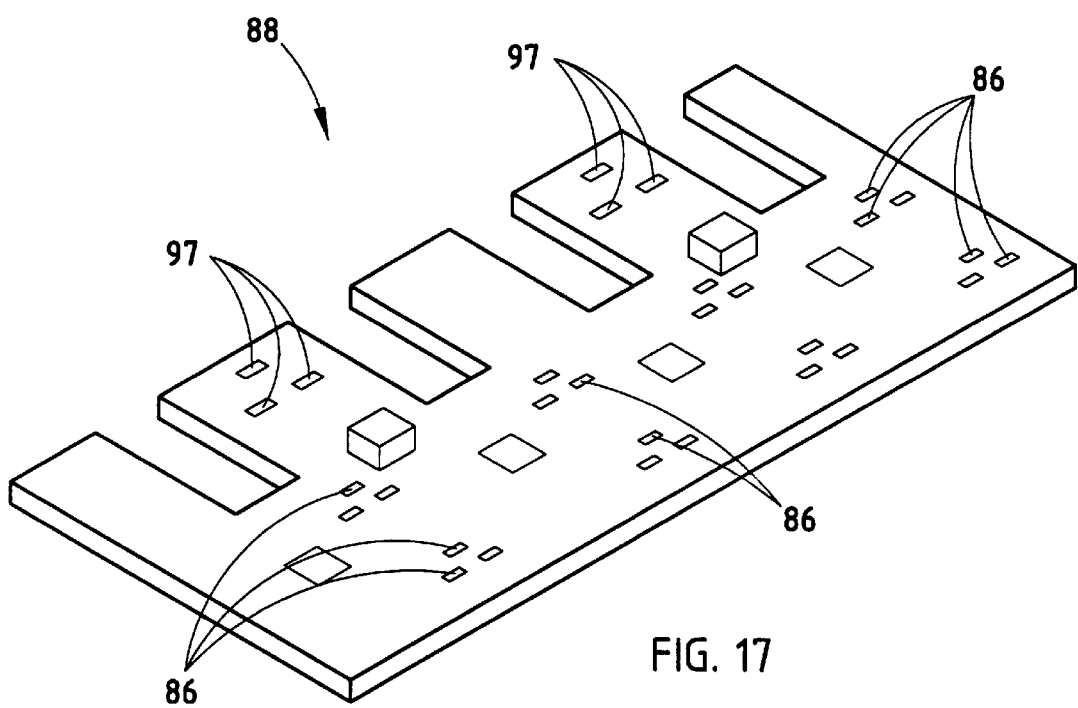
FIG. 17 is a perspective view of a flexible circuit board.

Electrical connector 64 includes a frame 72 having a base 71, four walls 75a–d, and a cover 74 (FIGS. 10–14). Cover 74 is hingedly attached to frame 72 by way of a living hinge 73. Base 71 and walls 75a–d define a compartment 76 in which the suppression circuitry for systems 20, 120, or 220 is housed (except the power source). Power for the electromagnetic suppressor is supplied through wires 78a–d, which correspond to power leads 24a–d, 124a–d, and 224a–d in systems 20, 120, and 220, respectively. Wires 78a–d enter into compartment 76 through four slots 77a–d defined in front wall 75a of frame 72. Wires 78a–d are each electrically coupled to a conductive wire connector 80 (FIGS. 10 and 16). Wires 78a–d are attached to wire connectors 80a–d by way of a pair of attachment flanges 84 that are crimped, or otherwise suitably coupled, around an uninsulated end of wires 78. Wire connectors 80 each include a set of teeth 82 which fit into corresponding teeth apertures 86 defined in a circuit board 88 (FIGS. 10 and 17). Circuit board 88 is preferably a flexible circuit board, but it will be understood that any type of printed circuit board could be used. Teeth 82 not only physically secure wire connectors 80 to flexible circuit board 88, but they also electrically couple wire connectors 80 to the circuitry (not shown) mounted on flexible circuit board 88. Wire connectors 80 further include prongs 90 which extend through slots 92 defined in the base 71 of frame 72. Prongs 90 provide power to the motors housed inside of housing 46.

Electrical connector 64 further includes a pair of conductive motor casing contacts 94a–b. Each motor casing contact 94 includes a pair of wing extensions 98a–b (see FIGS. 10 and 15). Wing extensions 98a–b fit through a pair of extended slots 96a and b defined in the base of frame 72. Wing extensions 98a–b contact one of the casings of the motors positioned inside of housing 46. The wing extensions 98a–b of the other one of the two motor casing contacts 94a–b contact the other casing of the other motor positioned inside of housing 46. As discussed earlier, the casings of the motors form a floating ground. Motor casing contacts 94a–b also include three teeth 95a–c which fit into respective teeth apertures 97 defined in flexible circuit board 88 (FIGS. 10 and 17). Teeth 95a–c serve the dual purpose of securing motor casing contacts 94a–b to flexible circuit board 88, along with electrically coupling motor casing contacts 94a–b to the circuitry of flexible circuit board 88 (not shown).

Figure 12:
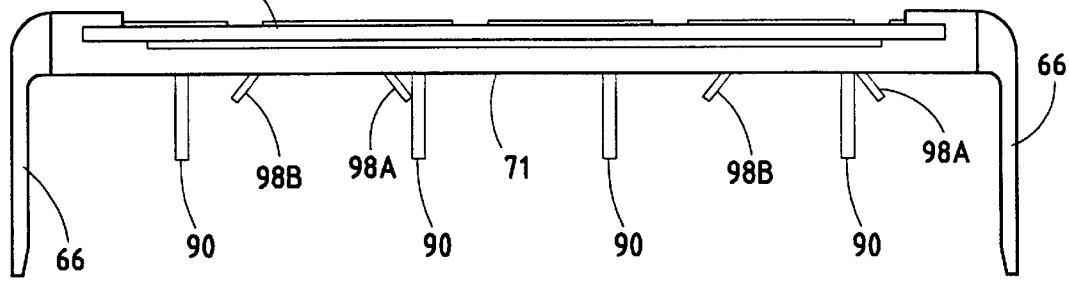
FIG. 12 is an end, elevational view of the electrical connector assembly of FIG. 11.

As shown in FIG. 12, prongs 90 of wire connectors 80 and wings extensions 98 of motor casing contacts 94 extend through base 71 of frame 72. When electrical connector 64 is attached to housing 46, prongs 90 and wing extensions 98 fit through respective apertures defined in housing 46. Electrical prongs 90 extend into power receptacles defined on the motors and thereby deliver power to the motors. Wing extensions 98 make contact with the metal casings surrounding each of the motors and thereby couple the interference suppression circuitry on board 88 to the floating ground defined by the motor casings.

Figure 13:
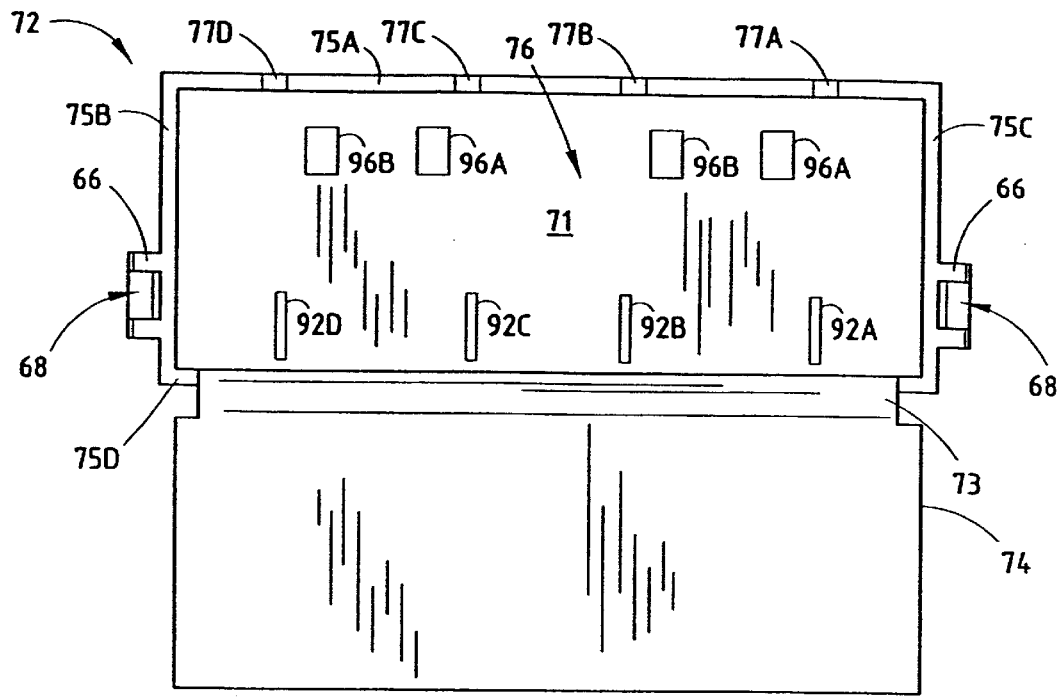
FIG. 13 is a plan view of the electrical connector of FIG. 11 shown without a circuit board.
Figure 14:
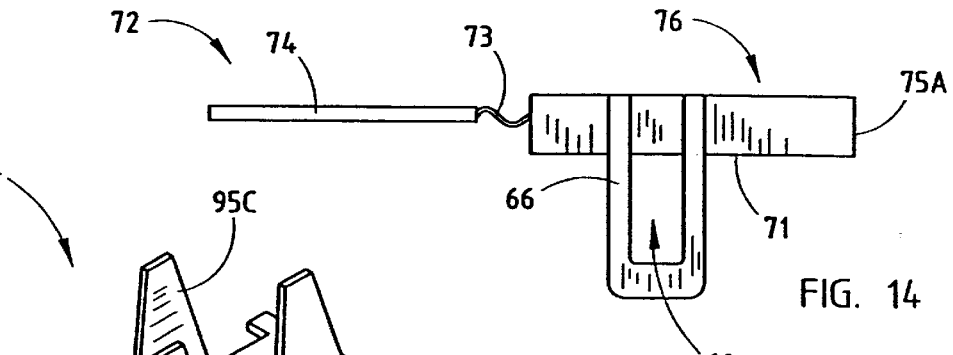
FIG. 14 is a side, elevational view of the electrical connector of FIG. 13.
Figure 15:
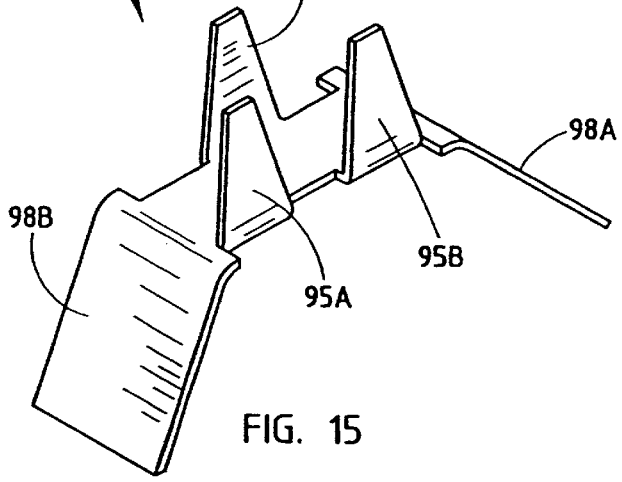
FIG. 15 is a perspective view of a motor casing contact.

As shown in FIGS. 13 and 14, frame 72 includes a hingedly attached cover 74. Cover 74 is preferably attached to frame 72 by a living hinge 73. Cover 74 is secured over compartment 76 by way of any known fastening technique, such as, but not limited to, cold staking, heat staking, snap welding, sonic welding, adhesive bonding, or the like. Cover 74 and frame 72 are preferably made of any suitable plastic material, although other non-conductive materials may be used.

Figure 18:
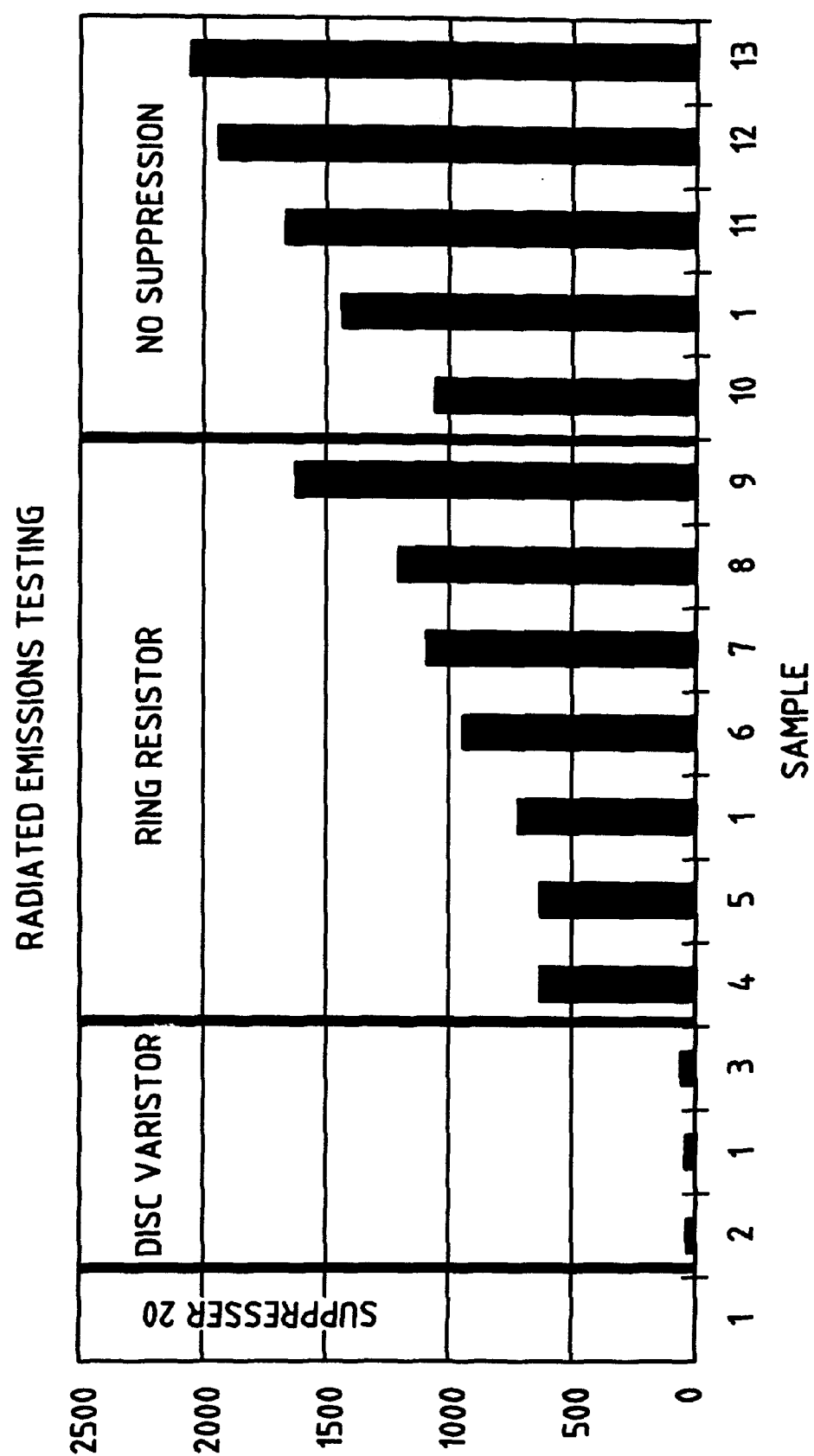
FIG. 18 is a chart of the test results of the radiated emissions from various side view mirror assemblies comparing the noise suppression methods of the present invention with various prior art noise suppression methods.

FIG. 18 depicts a comparison of the amount of radiated emissions from various mirror actuators using different suppression techniques. The different suppression techniques include the suppression circuitry of control system 20 of the present invention, a prior art disc varistor positioned inside of the motor casing, a prior art ring resistor positioned inside the motor casing, and no suppression. Sample 1 refers to control system 20 used in a mirror actuator assembly according to the principles disclosed herein. Samples 2–13 refer to other manufacturers' mirror actuator assemblies. The testing was conducted based on a proposed automotive standard for an acceptable amount of radiated interference between the frequencies of 20 MHz and 200 MHz. The radiation emitted from each of the samples 1–13 was measured over this frequency range, and the amplitude of the emitted radiation was measured in db$\mu$V/meter over this frequency range. For every peak measurement that exceeded the proposed standard, the number of db$\mu$V/meter by which the standard was exceeded was recorded. The sum of these peak measurements above the standard was then calculated and is depicted on the vertical axis of FIG. 18. For example, if sample 5 emitted a peak value of 50 db$\mu$V/meter at 80 megahertz, and the proposed standard for 80 MHz was 20 db$\mu$V/meter, the number 30 (50–20) is indicated. Similar numbers were calculated for every other peak that exceeded the standard and the sum of these numbers is plotted in FIG. 18.

As can be seen in FIG. 18, when control system 20 with its interference suppression was used with a mirror actuator manufactured by the assignee of the present invention (Sample 1), the radiated emissions were less than the proposed automotive standard over the entire range from 20 MHz to 200 MHz. When Sample 1 was used with a prior art disc varistor, ring resistor, and no suppression, it exceeded the proposed automotive standard. None of the other samples were able to meet the proposed automotive standard. The depicted results therefore indicate the increased level of suppression of the present invention as compared to the prior art.

While the present invention has been described in terms of the preferred embodiments discussed in the above specification, it will be understood by one skilled in the art that the present invention is not limited to these particular preferred embodiments, but includes any and all such modifications that are within the spirit and scope of the present invention as defined in the appended claims.

The embodiments of the present invention in which an exclusive property or privilege is claimed are defined as follows:

1. A vehicular mirror actuator system for adjustably positioning a reflective element comprising:
    a vehicle mirror actuator assembly, said vehicle mirror actuator assembly including a housing;
    at least one motor positioned within said housing and adapted to adjustably position the reflective element, said at least one motor having at least first and second terminals for receiving power, said motor having a casing which at least partially surrounds said motor;
    at least one power lead adapted to supply power for said at least one motor; and
    an electromagnetic interference suppressor for suppressing electromagnetic interference generated by said at least one motor, said electromagnetic interference suppressor operatively coupled between said power lead and said first and second terminals of said motor, said electromagnetic interference suppressor at least partially positioned externally to said motor casing.

2. The actuator of claim 1 wherein said electromagnetic interference suppressor comprises a choke operatively coupled to said power lead and said first and second motor terminals.

3. The actuator of claim 2 wherein said choke is a toroidal choke.

4. The actuator of claim 2 wherein said choke is a common mode choke.

5. The actuator of claim 2 further including:
    at least one gear for adjusting the position of the reflective element; and
    a housing which houses said motor and said at least one gear.

6. The actuator of claim 5 wherein said interference suppressor is mounted inside of said housing.

7. The actuator of claim 6 wherein said electromagnetic interference suppressor is mounted on a circuit board.

8. The actuator of claim 7 wherein said circuit board includes attached, stamped electrical leads which couple said circuit board to said motor.

9. The actuator of claim 5 wherein said interference suppressor is mounted externally to said housing.

10. The actuator of claim 9 wherein said interference suppressor is mounted on a circuit board housed by an electrical connector attached to said housing, said electrical connector including terminals which extend through said housing and electrically couple said circuit board to said motor.

11. The actuator of claim 1 wherein said casing is conductive and said suppressor includes a capacitor coupled between said first terminal and said casing.

12. The actuator of claim 11 further including a second capacitor coupled between said second terminal and said casing.

13. The actuator of claim 12 further including a capacitor coupled between said first and said second terminals.

14. The actuator of claim 1 wherein said electromagnetic interference suppressor comprises at least one ferrite bead coupled to said power lead and at least said first motor terminal.

15. The actuator of claim 14 wherein said casing is conductive and said suppressor includes a capacitor coupled between said casing and said first terminal.

16. The actuator of claim 15 further including a second capacitor coupled between said second terminal and said casing.

17. The actuator of claim 16 further including a capacitor coupled between said first and said second terminals.

18. The actuator of claim 14 further including at least one gear for adjusting the position of the reflective element, and a housing which houses said motor and said at least one gear.

19. The actuator of claim 18 wherein said interference suppressor is mounted inside of said housing.

20. The actuator of claim 19 wherein said electromagnetic interference suppressor is mounted on a circuit board.

21. The actuator of claim 20 wherein said circuit board includes attached, stamped electrical leads which couple said circuit board to said motor.

22. The actuator of claim 14 wherein said interference suppressor is mounted externally to said housing.

23. The actuator of claim 22 wherein said interference suppressor is mounted on a circuit board housed by an electrical connector attached to said housing, said electrical connector including terminals which extend through said housing and electrically couple said circuit board to said motor.

24. The actuator of claim 14 further including a second ferrite bead coupled between a second power lead and said second motor terminal.

25. The actuator of claim 24 further including a third ferrite bead coupled between said power lead and said first motor terminal, and a fourth ferrite bead coupled between said second power lead and second motor terminal.

26. The actuator of claim 1 further including an adjustable support which supports said actuator and the reflective element and attaches said actuator and the reflective element to a vehicle.

27. The actuator of claim 26 wherein said at least one motor is adapted to adjustably position the reflective element by adjusting the position of the support with respect to the vehicle.

28. The actuator of claim 1 wherein said electromagnetic interference suppressor comprises:
a housing which surrounds said vehicular mirror actuator, said housing including a metallic lining; and
at least one feed-through capacitor coupled to said metallic lining and said at least one power lead.

29. The actuator of claim 28 further including at least one ferrite bead coupled between said at least one power lead and said first motor terminal.

30. The actuator of claim 29 further including:
a second feed-through capacitor coupled to a second power lead and said metallic lining; and
a second ferrite bead coupled between said second power lead and said second motor terminal.

31. A vehicle mirror actuator having an electromagnetic interference suppressor for suppressing the electromagnetic interference generated by an adjustable vehicle mirror comprising:
a first motor for adjusting a reflective element in said vehicle mirror, said first motor having a casing and a first and second lead for receiving power;
a second motor for adjusting said vehicle reflective element, said second motor having a casing and a first and second lead for receiving power;
at least one power lead for providing power for said first and second motors;
a first electromagnetic interference suppressor electrically coupled to said power lead and said first and said second leads of each of said first and second motors; and
a second electromagnetic interference suppressor electrically coupled to said first lead of said first motor and said casing of said first motor.

32. The actuator of claim 31 wherein said second electromagnetic interference suppressor is at least one capacitor.

33. The actuator of claim 32 further including:
a second capacitor coupled between said second lead of said first motor and said casing of said first motor;
a third capacitor coupled between said first lead of said second motor and said casing of said second motor; and
a fourth capacitor coupled between said second lead of said second motor and said casing of said second motor.

34. The actuator of claim 33 further including a fifth capacitor coupled between said first and second leads of said first motor, and a sixth capacitor coupled between said first and second leads of said second motor.

35. The actuator of claim 33 wherein said first and second interference suppressors are both mounted on a circuit board.

36. The actuator of claim 35 further including a housing which surrounds said first and second motors and said circuit board.

37. The actuator of claim 36 wherein said circuit board includes attached, stamped electrical leads which couple said circuit board to said motor.

38. The actuator of claim 35 further including at least one gear for adjusting the position of the mirror and a housing which houses said motor and said at least one gear.

39. The actuator of claim 37 wherein both said first and second interference suppressors are mounted externally to said housing.

40. The actuator of claim 39 wherein said interference suppressors are mounted on a circuit board enclosed by an electrical connector attached to said housing, said electrical connector including terminals which extend through said housing and electrically couple said circuit board to said motor.

41. The actuator of claim 32 further including a choke coupled between said at least one power lead and said first and second motors.

42. The actuator of claim 41 wherein said choke is a four line common mode choke.

43. The actuator of claim 32 further including at least one ferrite bead coupled between said power lead and said first lead of said first motor.

44. The actuator of claim 43 further including a second ferrite bead coupled between said power lead and said second lead of said first motor, a third ferrite bead coupled between said power lead and said first lead of said second motor, and a fourth ferrite bead coupled between said power lead and said second lead of said second motor.

45. The actuator of claim 32 wherein said at least one capacitor is a feed-through capacitor coupled to said at least one power lead and a conductive surface which surrounds said actuator.

46. The actuator of claim 45 further including a second, third, and fourth feed-through capacitor coupled to a second, third, and fourth power lead, respectively, and said conductive surface.

47. The actuator of claim 46 further including a first, second, third, and fourth ferrite bead coupled between said first, second, third, and fourth power leads, respectively, and said first and second leads of said first and second motors.

48. The actuator of claim 47 wherein said first, second, third and fourth ferrite beads are all enclosed within said conductive surface.

49. The actuator of claim 48 further including a fifth, sixth, seventh, and eighth ferrite bead coupled between said first, second, third, and fourth power leads, respectively, and said first, second, third, and fourth feed-through capacitors, respectively.

50. A method for reducing electromagnetic interference generated by an adjustable vehicle mirror assembly having at least one motor for adjusting a reflective element in said adjustable vehicle mirror, said motor having a casing, comprising:
providing a housing for said vehicle mirror assembly and positioning said at least one motor in said housing;
providing a source of power for the at least one motor;
providing an electromagnetic interference suppressor that suppresses the interference generated by said at least one motor; and
positioning said interference suppressor externally to said motor casing.

51. The method of claim 50 further including coupling at least one capacitor between said source of power and said motor casing.

52. The method of claim 51 further including providing at least two leads for said motor and coupling said two leads together with a capacitor.

53. The method of claim 50 further including mounting said interference suppressor and said at least one capacitor on a circuit board.

54. The method of claim 53 further including mounting said circuit board in a connector which is attached to a housing that surrounds said motor.

55. The method of claim 54 further including providing a metallic lining attached to said housing and providing at least one feed-through capacitor coupled between said source of power and said metallic lining.

56. A vehicular actuator for positioning a reflective element of a mirror assembly comprising:

a housing;

at least one motor in said housing for adjusting the reflective element, said motor including a first and a second terminal for receiving power, and a metallic casing which at least partially encases said motor; and an electromagnetic interference suppressor including an electrical contact member that makes electrical contact with said metallic casing.

57. The vehicle actuator of claim 56 wherein said electromagnetic interference suppressor includes a first capacitor coupled between said first terminal and said motor casing, and a second capacitor coupled between said second terminal and said motor casing.

58. The vehicle actuator of claim 57 further including at least one power lead wherein said electromagnetic interference suppressor is coupled between said power lead and said first and second terminals to said motor.

59. The vehicle actuator of claim 58 further including at least one gear and a housing which houses said at least one gear and said motor, said reflective element positioned outside said housing.

60. The vehicle actuator of claim 59 wherein said interference suppressor is located in an electrical connector mounted on the exterior of said housing.

61. The vehicle actuator of claim 59 wherein said interference suppressor is mounted on a circuit board positioned inside of said housing.

62. The vehicle actuator of claim 59 wherein said interference suppressor includes a choke coupled between said power lead and said first terminal of said motor.

63. The vehicle actuator of claim 59 wherein said interference suppressor includes at least one ferrite bead coupled between said power lead and said first terminal of said motor.

64. The vehicle actuator of claim 62 further including a third capacitor mounted on said circuit board and coupled between said first and second terminals of said motor.

65. The vehicle actuator of claim 63 further including a third capacitor mounted on said circuit board and coupled between said first and second terminals of said motor.

66. A vehicular mirror system comprising:

a vehicle mirror assembly mounted on the exterior of a vehicle;

at least one motor adapted to adjustably position said vehicle mirror assembly on the vehicle, said at least one motor having at least first and second terminals for receiving power, said motor having a casing which at least partially surrounds said motor;

at least a first power lead adapted to supply power for said at least one motor; and an electromagnetic interference suppressor for suppressing electromagnetic interference generated by said at least one motor, said electromagnetic interference suppressor operatively coupled between said first power lead and said motor, said electromagnetic interference suppressor at least partially positioned externally to said motor casing.

67. The mirror system of claim 66 wherein said electromagnetic interference suppressor comprises a first capacitor coupled between said motor casing and said first power lead.

68. The mirror system of claim 67 wherein said electromagnetic interference suppressor further includes a second capacitor coupled between said motor casing and a second power lead.

69. The mirror system of claim 68 wherein said first and second capacitors are feed-through capacitors mounted on a conductive surface which surrounds said motor.

70. The mirror system of claim 69 further including a first ferrite bead coupled between said first power lead and said first terminal, and a second ferrite bead coupled between said second power lead and said second terminal.

71. The mirror system of claim 70 wherein said first and second ferrite beads are positioned inside of said conductive surface.

72. The mirror system of claim 68 further including a capacitor coupled between said first and second terminals externally to said motor casing.

73. The mirror system of claim 72 further including a choke coupled between said first and second power leads and said first and second terminals.

74. The mirror system of claim 72 further including a first ferrite bead coupled between said first terminal and first power lead, and a second ferrite bead coupled between said second terminal and said second ferrite bead.

* * * * *

UNITED STATES PATENT AND TRADEMARK OFFICE
CERTIFICATE OF CORRECTION

PATENT NO. : 6,229,226 B1 Page 1 of 1
APPLICATION NO. : 09/277632
DATED : May 8, 2001
INVENTOR(S) : Mark E. Kramer and Robert E. Schnell It is certified that error appears in the above-identified patent and that said Letters Patent is hereby corrected as shown below:

<u>Column 2</u>:
Line 53, "," should be --;--.

Signed and Sealed this

Twenty-fourth Day of October, 2006

JON W. DUDAS
*Director of the United States Patent and Trademark Office*